United States Patent
Chen

(10) Patent No.: US 10,410,804 B2
(45) Date of Patent: Sep. 10, 2019

(54) MULTI-STAGE INPUT DEVICE

(71) Applicant: Primax Electronics Ltd., Taipei (TW)

(72) Inventor: Chung-Yuan Chen, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 7 days.

(21) Appl. No.: 15/824,375

(22) Filed: Nov. 28, 2017

(65) Prior Publication Data

US 2018/0166228 A1 Jun. 14, 2018

Related U.S. Application Data

(60) Provisional application No. 62/431,637, filed on Dec. 8, 2016.

(51) Int. Cl.

| H01H 13/14 | (2006.01) |
|---|---|
| H01H 13/20 | (2006.01) |
| G06F 3/02 | (2006.01) |
| H01H 13/70 | (2006.01) |
| H01H 13/64 | (2006.01) |
| G06F 3/0354 | (2013.01) |

(52) U.S. Cl.
CPC .............. *H01H 13/14* (2013.01); *G06F 3/02* (2013.01); *G06F 3/0202* (2013.01); *G06F 3/0219* (2013.01); *H01H 13/20* (2013.01); *H01H 13/64* (2013.01); *H01H 13/70* (2013.01); *G06F 3/03543* (2013.01); *H01H 2233/07* (2013.01); *H01H 2235/01* (2013.01)

(58) Field of Classification Search
CPC ........ H01H 13/14; H01H 13/64; H01H 13/70; H01H 9/00; G06F 3/02; G06F 3/0202

USPC ................. 200/1 B, 5 A, 341, 512
See application file for complete search history.

(56) References Cited

U.S. PATENT DOCUMENTS

| 2,769,043 | A | * | 10/1956 | Ulinski | H01H 21/26 200/1 B |
|---|---|---|---|---|---|
| 5,834,714 | A | * | 11/1998 | Berger | H01H 13/702 200/5 A |
| 6,972,385 | B2 | * | 12/2005 | Krebs | H01H 13/64 200/1 B |
| 7,060,920 | B2 | * | 6/2006 | Serizawa | H01H 23/003 200/1 B |
| 7,332,688 | B2 | * | 2/2008 | Browne | B60K 37/06 200/341 |
| 2003/0116411 | A1 | * | 6/2003 | Rodriguez Navarrete | H01H 13/64 200/1 B |

(Continued)

*Primary Examiner* — Edwin A. Leon
*Assistant Examiner* — Iman Malakooti
(74) *Attorney, Agent, or Firm* — Muncy, Geissler, Olds & Lowe, P.C.

(57) ABSTRACT

The present invention provides a multi-stage input device. The multi-stage input device includes a keycap, a multi-stage cushion component, and a circuit board assembly. The multi-stage cushion component is located between the keycap and the circuit board assembly to support the keycap. When the keycap is depressed to a light pressing level position, the keycap triggers a multi-stage switch of the circuit board assembly, so that the multi-stage switch generates a light-pressing signal to perform a first function. When the keycap is depressed to a heavy pressing level position, the keycap triggers the multi-stage switch of the circuit board assembly, so that the multi-stage switch generates a heavy-pressing signal to perform a second function.

6 Claims, 5 Drawing Sheets

(56) References Cited

U.S. PATENT DOCUMENTS

| | | | |
|---|---|---|---|
| 2009/0301852 A1* | 12/2009 | Keist | B60K 37/06 200/341 |
| 2012/0024682 A1* | 2/2012 | Huang | G06F 3/0202 200/5 A |
| 2015/0227213 A1* | 8/2015 | Cho | G06F 3/0219 345/157 |
| 2015/0340176 A1* | 11/2015 | Wu | H01H 13/14 200/5 A |
| 2016/0085380 A1* | 3/2016 | Oh | G06F 3/0416 345/177 |

* cited by examiner

MULTI-STAGE INPUT DEVICE

CROSS REFERENCE TO RELATED APPLICATIONS

This application claims priority of U.S. Provisional Application No. 62/431,637 filed on Dec. 8, 2016 under 35 U.S.C. § 119(e), the entire contents of all of which are hereby incorporated by reference.

FIELD OF THE INVENTION

The present invention relates to a multi-stage input device, and in particular, to a multi-stage input device with a single button that can produce multiple functions.

BACKGROUND OF THE INVENTION

A keyboard and a mouse are indispensable devices when modern people use computers. There are many buttons on the keyboard and the mouse for a user to press to input an instruction. A traditional keyboard and mouse have various button designs to generate a button signal. For example, in a mechanical button design, a multi-stage switch of a circuit is triggered to generate a button triggering signal by using a conductive pin, and in an optical button design, a button triggering signal is generated according to changes of receiving or blocking of light. However, as described above, when the button is pressed, the button can generate only a single signal. In other words, a single button can generate only one signal, that is, perform one function, regardless of whether the button is pressed lightly or heavily. In this way, for heavy users (e-sports players) who need to output a plurality of different button signals in an extremely short time, they have to change positions of fingers to press different buttons in the extremely short time but cannot avoid making mistakes. In addition, muscles of the users may get hurt for long-time frequent operations. Therefore, a conventional button is unfriendly to the heavy users and there are needs that have not been satisfied yet when the heavy users perform operations. In view of this, the conventional button still needs to be improved urgently.

SUMMARY OF THE INVENTION

A main objective of the present invention is to provide a multi-stage input device, where a multi-stage cushion component is disposed between a keycap and a circuit board assembly, so as to meet a need of a user to perform multiple functions by applying different external forces on a single button.

A preferred implementation conception of the present invention is to provide a multi-stage input device, including:

a keycap, including a triggering structure, where when the keycap is not under an external force, the keycap is located at an initial position, and when the keycap is under the external force, the keycap is depressed to a light pressing level position or a heavy pressing level position according to strength of the external force;

a circuit board assembly, located below the keycap, where the circuit board assembly includes a circuit board and a multi-stage switch that is signal-connected to the circuit board; and the multi-stage switch can be triggered by the triggering structure to generate a light-pressing control signal or a heavy-pressing control signal; and a multi-stage cushion component, located between the keycap and the circuit board assembly to support the keycap, where the keycap is depressed to the multi-stage cushion component according to the strength of the external force; when the strength of the external force is within a first strength interval, the multi-stage cushion component deforms and the keycap is located at the light pressing level position; and when the strength of the external force is within a second strength interval, the multi-stage cushion component deforms and the keycap is located at the heavy pressing level position, wherein when the keycap is located at the initial position, the keycap does not trigger the multi-stage switch and the multi-stage switch does not generate a signal; when the keycap is located at the light pressing level position, the keycap triggers the multi-stage switch, so that the multi-stage switch generates the light-pressing control signal to perform a first function; and when the keycap is located at the heavy pressing level position, the keycap triggers the multi-stage switch, so that the multi-stage switch generates the heavy-pressing control signal to perform a second function.

In a preferred embodiment, the multi-stage input device further includes an upper cover, where the upper cover is disposed between the keycap and the circuit board assembly; and the upper cover includes a through hole, so that when the keycap is depressed, the triggering structure is inserted into the through hole to trigger the multi-stage switch.

In a preferred embodiment, the multi-stage cushion component includes a first elastic component and a second elastic component, where the first elastic component is inserted into the through hole, and two ends of the first elastic component respectively abut against the circuit board and the keycap; one end of the second elastic component abuts against the circuit board, and the other end of the second elastic component is suspended; before the keycap is under the external force and is depressed to a light pressing level position, the keycap does not get in contact with the second elastic component; and when the keycap is under the external force and is depressed to a light pressing level position, the keycap gets in contact with the other end of the second elastic component.

In a preferred embodiment, the multi-stage input device further includes an upper cover, where the upper cover is disposed between the keycap and the circuit board assembly; and the upper cover includes a through hole, and a first groove and a second groove that are disposed side by side in a front-rear direction; and when the keycap is depressed, the triggering structure is inserted into the through hole to trigger the multi-stage switch.

In a preferred embodiment, the multi-stage cushion component includes a front elastic component and a back elastic component; the front elastic component is disposed in the first groove, and two ends of the front elastic component respectively abut against the keycap and the upper cover; the back elastic component is disposed in the second groove, and one end of the back elastic component abuts against the upper cover, and the other end of the back elastic component is suspended; before the keycap is under the external force and is depressed to a light pressing level position, the keycap does not get in contact with the back elastic component; and when the keycap is under the external force and is depressed to a light pressing level position, the keycap gets in contact with the other end of the back elastic component.

In a preferred embodiment, the front elastic component has a first length, the back elastic component has a second length, and the first length is greater than the second length.

In a preferred embodiment, a distance between the initial position and a first level position is 1 millimeter, and a distance between the first level position and a second level position is 1 millimeter In a preferred embodiment, the multi-stage switch is selected from a non-contact capacitive multi-stage switch, a contact capacitive multi-stage switch, a resistive multi-stage switch, an optical sensing multi-stage switch, or a mechanical multi-stage switch.

In a preferred embodiment, the multi-stage switch is located right below the triggering structure; and when the keycap is under the external force and is depressed, the triggering structure presses the multi-stage switch to trigger the multi-stage switch.

DETAILED DESCRIPTION OF THE PREFERRED EMBODIMENT

The following embodiments are used as examples to describe the present invention and are not intended to limit the present invention. It should be noted that in the following embodiments and accompanying drawings, components that are not related to the present invention are omitted and not shown. Moreover, for ease of understanding, sizes and proportions of components are shown in an exaggerative way and are different from an actual product.

Figure 1:
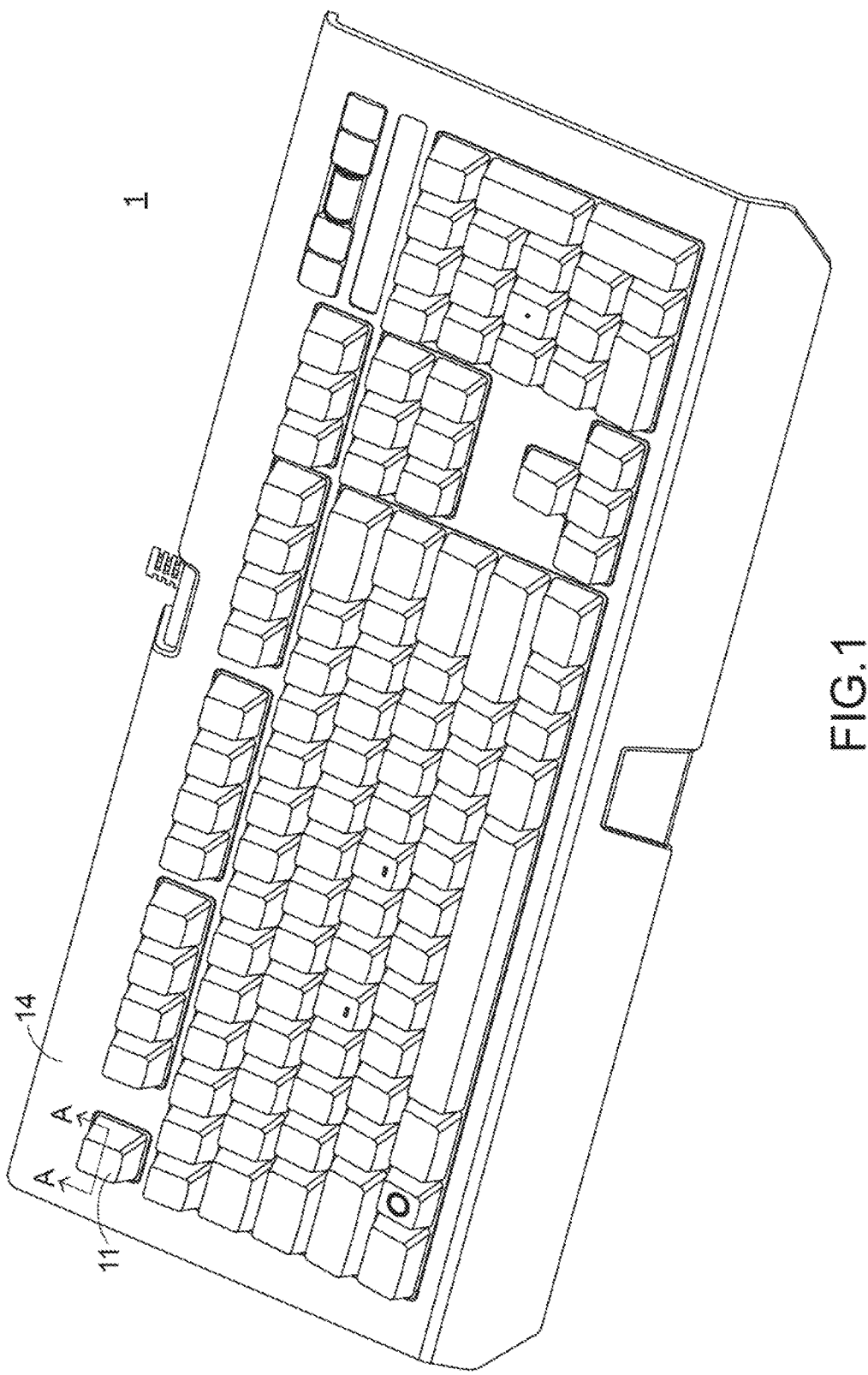
FIG. 1 is a schematic three-dimensional view of a multi-stage input device according to a first embodiment of the present invention.
Figure 2:
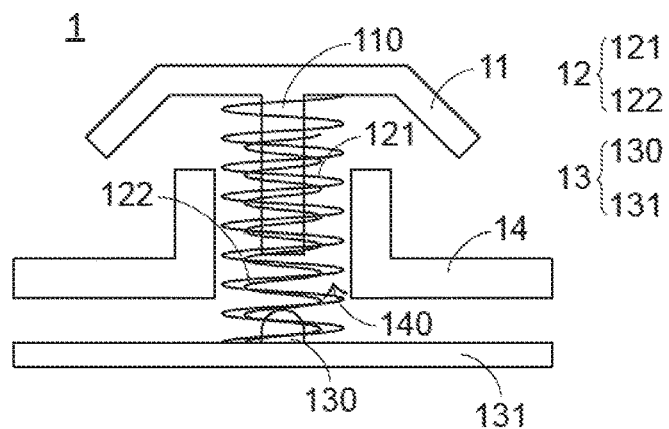
FIG. 2 is a schematic sectional view of sectioning the multi-stage input device along an A-A section line in FIG. 1 to be at an initial position according to the first embodiment of the present invention.
Figure 3:
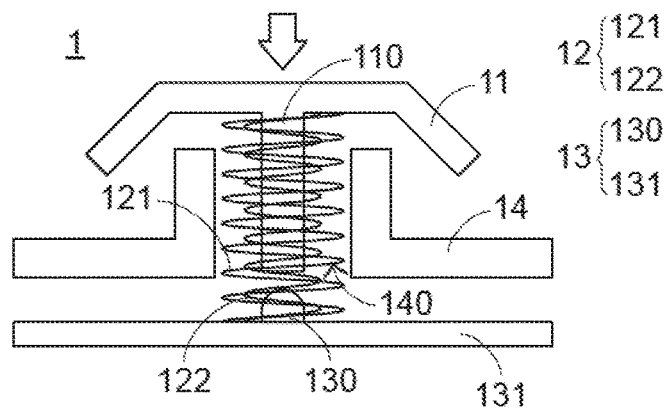
FIG. 3 is a schematic sectional view of sectioning the multi-stage input device along the A-A section line in FIG. 1 to be at a light pressing level position according to the first embodiment of the present invention.
Figure 4:
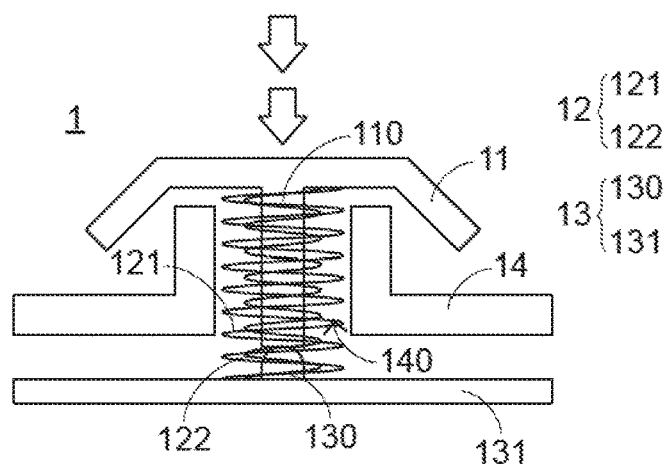
FIG. 4 is a schematic sectional view of sectioning the multi-stage input device along the A-A section line in FIG. 1 to be at a heavy pressing level position according to the first embodiment of the present invention.
Figure 5:
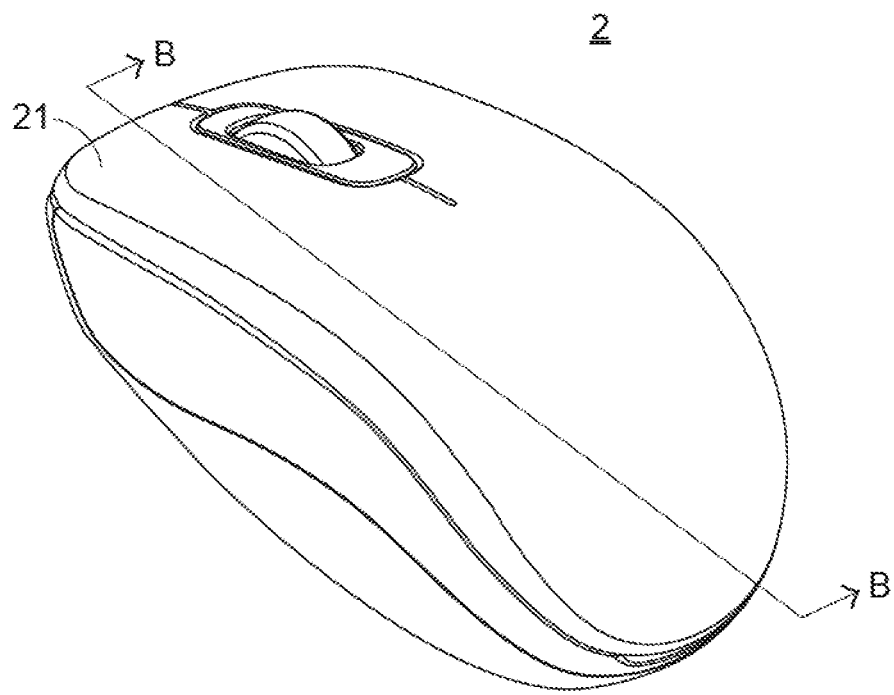
FIG. 5 is a schematic three-dimensional view of a multi-stage input device according to a second embodiment of the present invention.

Referring to FIG. 1 to FIG. 4, FIG. 1 is a schematic three-dimensional view of a multi-stage input device according to a first embodiment of the present invention. FIG. 2 to FIG. 4 are schematic sectional views of sectioning a keycap of the multi-stage input device along an A-A section line in FIG. 1 to be respectively at an initial position, a light pressing level position, and a heavy pressing level position according to the first embodiment of the present invention. The multi-stage input device 1 in the first embodiment of the present invention is a keyboard. For convenience of description, in the following first embodiment of the present invention, only a single keycap is described, but actually a quantity of keycaps is not limited, which is noted herein first.

The multi-stage input device 1 in the present invention includes a keycap 11, an upper cover 14, a multi-stage cushion component 12, and a circuit board assembly 13. The multi-stage cushion component 12 is located between the keycap 11 and the circuit board assembly 13, and separately abuts against the keycap 11 and the circuit board assembly 13 to raise up the keycap 11. That is, when the keycap 11 is not under an external force, the keycap 11 is raised up by the multi-stage cushion component 12, and the keycap 11 is located at an initial position (as shown in FIG. 2). Then, when the keycap 11 is under the external force in a downward direction, the keycap 11 is depressed to the multi-stage cushion component 12 to deform the multi-stage cushion component 12 according to strength of the external force. Moreover, the keycap 11 is depressed to a light pressing level position (as shown in FIG. 3) or a heavy pressing level position (as shown in FIG. 4) according to the strength of the external force.

It should be specially noted herein that the multi-stage input device 1 in the present invention includes, but is not limited to, a keyboard and a mouse. A quantity of keycaps 11 in the present invention may be arranged according to an actual need of the keyboard and the mouse, which is not limited herein.

Specifically, when the strength of the external force lightly applied by a user is within a first strength interval (for example, 50 grams weight to 100 grams weight), the multi-stage cushion component 12 slightly deforms and the keycap 11 is depressed to be located at the light pressing level position (for example, the keycap 11 is depressed by 1 millimeter). When the strength of the external force heavily applied by the user is within a second strength interval (for example, 100 grams weight to 150 grams weight), the multi-stage cushion component 12 greatly deforms and the keycap 11 is depressed to be located at the heavy pressing level position (for example, the keycap 11 is further depressed by 1 millimeter, that is, is depressed by 2 millimeters in total).

Furthermore, the circuit board assembly 13 includes a circuit board 131 and a multi-stage switch 130 that is signal-connected to the circuit board 131. When the keycap 11 is located at the initial position, the keycap 11 does not trigger the multi-stage switch 130 and the multi-stage switch 130 does not generate a signal. When the keycap 11 is depressed, the multi-stage switch 130 can be triggered by a triggering structure 110 to generate a light-pressing control signal or a heavy-pressing control signal according to a degree by which the keycap 11 is depressed. In a design of the multi-stage input device 1 in the present invention, when the keycap 11 is located at the light pressing level position (referring to FIG. 3), the triggering structure 110 of the keycap 11 is depressed to trigger the multi-stage switch 130, so that the multi-stage switch 130 generates the light-pressing control signal to perform a first function. When the keycap 11 is located at the heavy pressing level position (referring to FIG. 4), the triggering structure 110 of the keycap 11 is depressed to trigger the multi-stage switch 130, so that the multi-stage switch 130 generates the heavy-pressing control signal to perform a second function. In this way, a plurality of functions can be performed by lightly and heavily pressing a single keycap 11. A computer game is used as an example. When the user presses the keycap 11 to the light pressing level position, the light-pressing control signal can be generated to make a character in the computer game slightly shake a fist, slowly walk, or perform a function of first-level magic. When the user presses the keycap 11 to the heavy pressing level position, the heavy-pressing control signal can be generated to make the character in the computer game heavily shake a fist, quickly walk, or perform a function of second-level magic. Therefore, a plurality of different button signals can be instantaneously output in an extremely short time only by operating a single keycap 11, thereby satisfying a need of a heavy user (an e-sports player).

Further, refer to FIG. 2 to FIG. 4. The upper cover 14 is disposed between the keycap 11 and the circuit board assembly 13. The upper cover 14 includes a through hole 140, so that when the keycap 11 is depressed by the user, the triggering structure 110 may be inserted into the through hole 140 to trigger the multi-stage switch 130 of the circuit board assembly 13 below. The multi-stage switch 130 is selected from a non-contact capacitive multi-stage switch, a contact capacitive multi-stage switch, a resistive multi-stage switch, an optical sensing multi-stage switch, or a mechanical multi-stage switch. If the multi-stage switch is a mechanical multi-stage switch and the mechanical multi-stage switch is designed to be located right below the triggering structure 110, when the keycap 11 is depressed by the user, the triggering structure 11 may press the mechanical multi-stage switch to trigger the mechanical multi-stage switch.

Next, the multi-stage cushion component 12 is described. In the first embodiment of the present invention, the multi-stage cushion component 12 includes a first elastic component 121 and a second elastic component 122. The first elastic component 121 is inserted into the through hole 140 of the upper cover 14, and two ends of the first elastic component 121 respectively abut against the circuit board 131 and the keycap 11 to support the keycap 11. One end of the second elastic component 122 abuts against the circuit board 131, and the other end of the second elastic component 122 is suspended. Preferably, a diameter of the first elastic component 121 is greater than a diameter of the second elastic component 122, so that the first elastic component 121 is sleeved outside the second elastic component 122. Therefore, before the keycap 11 is depressed by the user to a light pressing level position, the keycap 11 only gets in contact with the first elastic component 121 and does not get in contact with the second elastic component 122, so that the user may feel only a counterforce fed back by the first elastic component 121 to resist being depressed, and the counterforce is relatively small at the moment. When the keycap 11 is depressed by the user to a light pressing level position, the keycap 11 right abuts against the other end of the second elastic component 122. If the user further applies a force downward at the moment, the user may feel a counterforce generated when the first elastic component 121 and the second elastic component 122 being depressed together, and the counterforce is relatively large at the moment. That is, because the counterforce becomes larger, the user may feel the force and recognize that depressing has reached a specified stage (the light pressing level position is reached and the first function is already performed). Further, if the user intends to move downwards the keycap 11 from the light pressing level position to the heavy pressing level position, a larger force needs to be applied. By means of this setting, the user can quickly determine, according to a feedback felt by fingers, whether currently the keycap 11 is located at the light pressing level position or the heavy pressing level position.

It should be specially noted herein that in the foregoing description, a quantity of level positions of the keycap 11 is two (the light pressing level position and the heavy pressing level position), which is merely an example for convenience of description. The quantity of level positions of the keycap 11 may be changed to be more than three and different functions are respectively and correspondingly performed, which also falls within the scope of the present invention.

Figure 6:
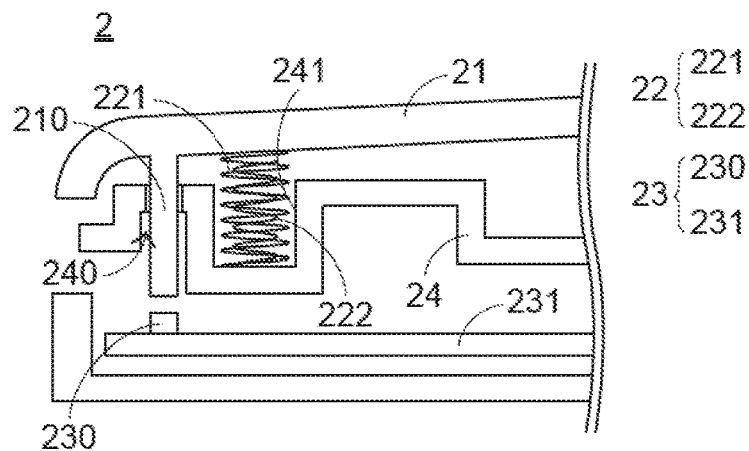
FIG. 6 is a schematic sectional view of sectioning the multi-stage input device along a B-B section line in FIG. 5 to be at an initial position according to the second embodiment of the present invention.
Figure 7:
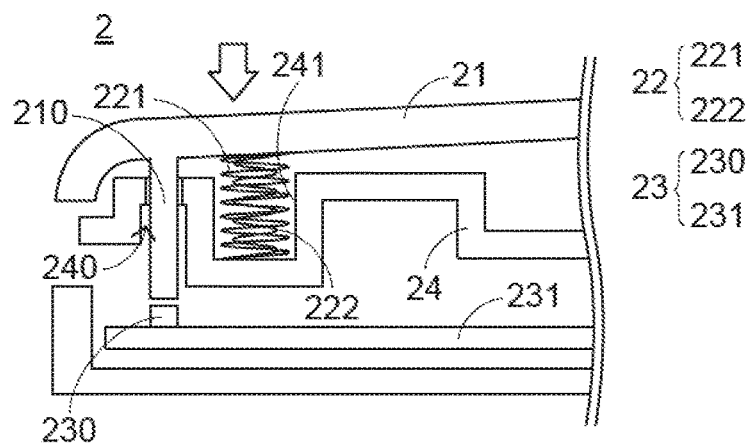
FIG. 7 is a schematic sectional view of sectioning the multi-stage input device along the B-B section line in FIG. 5 to be at a light pressing level position according to the second embodiment of the present invention.
Figure 8:
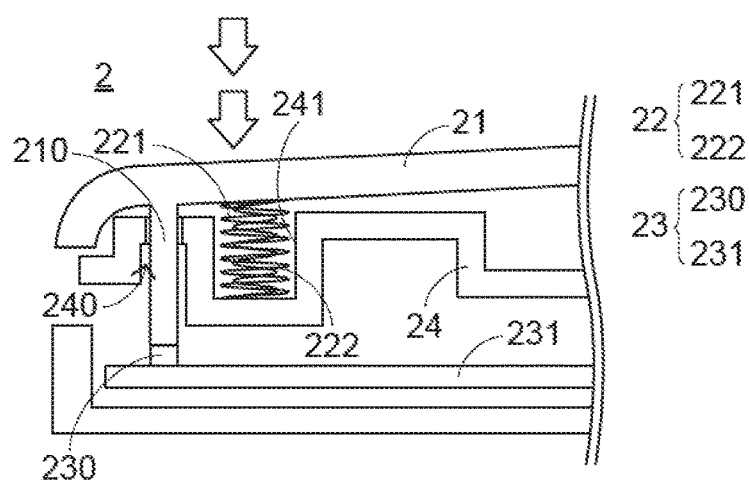
FIG. 8 is a schematic sectional view of sectioning the multi-stage input device along the B-B section line in FIG. 5 to be at a heavy pressing level position according to the second embodiment of the present invention.

Referring to FIG. 5 to FIG. 8, FIG. 5 is a schematic three-dimensional view of a multi-stage input device according to a second embodiment of the present invention. FIG. 6 to FIG. 8 are schematic sectional views of sectioning a keycap of the multi-stage input device along a B-B section line in FIG. 5 to be respectively at an initial position, a light pressing level position, and a heavy pressing level position according to the second embodiment of the present invention. The multi-stage input device 2 in the second embodiment of the present invention is a mouse. Similar to the first embodiment, in the second embodiment, the multi-stage input device 2 includes a keycap 21, an upper cover 24, a multi-stage cushion component 22, and a circuit board assembly 23. The multi-stage cushion component 22 is located between the keycap 21 and the circuit board assembly 23. Preferably, the multi-stage cushion component 22 is located between the keycap 21 and the upper cover 24, and separately abuts against the keycap 21 and the upper cover 24 to raise up the keycap 21. That is, when the keycap 21 is not under an external force, the keycap 21 is raised up by the multi-stage cushion component 22, and the keycap 21 is located at an initial position (as shown in FIG. 6). Then, when the keycap 21 is under the external force, the keycap 21 is depressed to the multi-stage cushion component 22 according to strength of the external force. Moreover, the keycap 21 is depressed to a light pressing level position (as shown in FIG. 7) or a heavy pressing level position (as shown in FIG. 8) according to the strength of the external force.

Furthermore, the circuit board assembly 23 includes a circuit board 231 and a multi-stage switch 230 that is signal-connected to the circuit board 231. When the keycap 21 is located at the initial position, the keycap 21 does not trigger the multi-stage switch 230 and the multi-stage switch 230 does not generate a signal. When the keycap 21 is depressed, the multi-stage switch 230 can be triggered by a triggering structure 210 to generate a light-pressing control signal or a heavy-pressing control signal according to a degree by which the keycap 21 is depressed. In a design of the multi-stage input device 2 in the present invention, when the keycap 21 is located at the light pressing level position (referring to FIG. 7), the triggering structure 210 of the keycap 21 is depressed to trigger the multi-stage switch 230, so that the multi-stage switch 230 generates the light-pressing control signal to perform a first function. When the keycap 21 is located at the heavy pressing level position (referring to FIG. 8), the triggering structure 210 of the keycap 21 is depressed to trigger the multi-stage switch 230, so that the multi-stage switch 230 generates the heavy-pressing control signal to perform a second function. In this way, a plurality of functions can be performed by lightly and heavily pressing a single keycap 21.

Further, refer to FIG. 6 to FIG. 8. The upper cover 24 is disposed between the keycap 21 and the circuit board assembly 23. The upper cover 24 includes a through hole 240, so that when the keycap 21 is depressed by a user, the triggering structure 210 of the keycap 21 may be inserted into the through hole 240 to trigger the multi-stage switch 230 of the circuit board assembly 23 below.

Next, the multi-stage cushion component 22 is described. In the second embodiment of the present invention, the multi-stage cushion component 22 includes a first elastic component 221 and a second elastic component 222. The first elastic component 221 is inserted into an accommodation slot 241 of the upper cover 24, and two ends of the first elastic component 221 respectively abut against the upper cover 24 and the keycap 21. One end of the second elastic component 222 abuts against the upper cover 24, and the other end of the second elastic component 222 is suspended. Preferably, a diameter of the first elastic component 221 is greater than a diameter of the second elastic component 222, so that the first elastic component 221 is sleeved outside the second elastic component 222. Therefore, before the keycap 21 is depressed by the user to a light pressing level position, the keycap 21 only gets in contact with the first elastic component 221 and does not get in contact with the second elastic component 222, so that the user may feel only a counterforce fed back by the first elastic component 221 to resist being depressed, and the counterforce is relatively small at the moment. When the keycap 21 is depressed by the user to a light pressing level position, the keycap 21 right abuts against the other end of the second elastic component 222. If the user further applies a force downward at the moment, the user may feel a counterforce generated when the first elastic component 221 and the second elastic component 222 resist being depressed together. That is, because the counterforce becomes larger, the user may feel the force and quickly recognize that depressing has reached a specified stage (the light pressing level position is reached and the first function is already performed). Further, if the user intends to move downwards the keycap 21 from the light pressing level position to the heavy pressing level position, a larger force needs to be applied.

Figure 9:
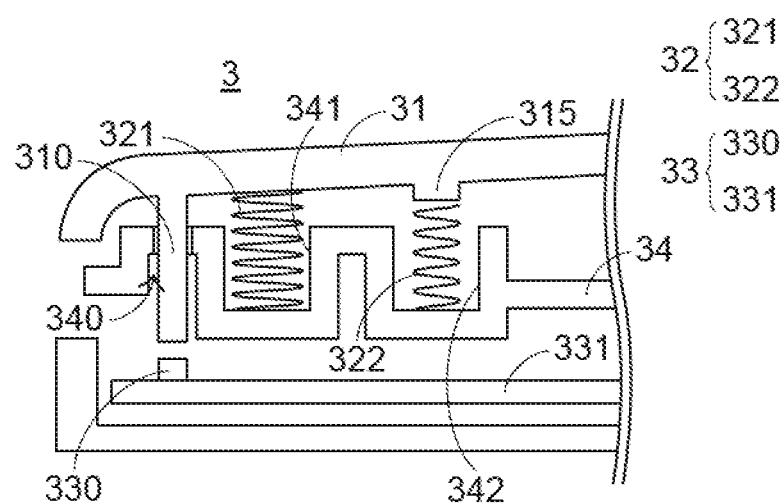
FIG. 9 is a schematic sectional view of sectioning a multi-stage input device along the B-B section line in FIG. 5 to be at an initial position according to a third embodiment of the present invention.

Referring to FIG. 9, FIG. 9 is a schematic sectional view when a multi-stage input device is located at an initial position according to a third embodiment of the present invention. The multi-stage input device in the third embodiment of the present invention is still a mouse. Similar to the second embodiment, in the third embodiment, the multi-stage input device 3 includes a keycap 31, an upper cover 34, a multi-stage cushion component 32, and a circuit board assembly 33. The multi-stage cushion component 32 is located between the keycap 31 and the circuit board assembly 33, and separately abuts against the keycap 31 and the upper cover 34 to raise up the keycap 31. That is, when the keycap 31 is not under an external force, the keycap 31 is raised up by the multi-stage cushion component 32, and the keycap 31 is located at an initial position. When the keycap 31 is under the external force, the keycap 31 is depressed to the multi-stage cushion component 32 according to strength of the external force. Moreover, the keycap 31 is depressed to a light pressing level position or a heavy pressing level position according to the strength of the external force. The light pressing level position and the heavy pressing level position are similar to those in the second embodiment, and are not described in detail herein again.

Furthermore, the circuit board assembly 33 includes a circuit board 331 and a multi-stage switch 330 that is signal-connected to the circuit board 331. When the keycap 31 is located at the initial position, the keycap 31 does not trigger the multi-stage switch 330 and the multi-stage switch 330 does not generate a signal. When the keycap 31 is depressed, the multi-stage switch 330 can be triggered by a triggering structure to generate a light-pressing control signal or a heavy-pressing control signal according to a degree by which the keycap 31 is depressed. In a design of the multi-stage input device 3 in the present invention, when the keycap 31 is located at the light pressing level position, the triggering structure 310 of the keycap 31 is depressed to trigger the multi-stage switch 330, so that the multi-stage switch 330 generates the light-pressing control signal to perform a first function. When the keycap 31 is located at the heavy pressing level position, the triggering structure 310 of the keycap 31 is depressed to trigger the multi-stage switch 330, so that the multi-stage switch 330 generates the heavy-pressing control signal to perform a second function. As described above, the light pressing level position and the heavy pressing level position are similar to those in the second embodiment, and are not described in detail herein again. In this way, a plurality of functions can be performed by lightly and heavily pressing a single keycap 31.

A difference between the third embodiment and the second embodiment is that in the third embodiment, the upper cover 34 includes a through hole 340, and a first groove 341 and a second groove 342 that are disposed side by side in a front-rear direction, and the multi-stage cushion component includes a front elastic component 321 and a back elastic component 322. The front elastic component 321 is disposed in the first groove 341, and two ends of the front elastic component 321 respectively abut against the keycap 31 and the upper cover 34. The back elastic component 322 is disposed in the second groove 342, and one end of the back elastic component 322 abuts against the upper cover 34, and the other end of the back elastic component 322 is suspended. Before the keycap 31 is under the external force and is depressed to a light pressing level position, the keycap 31 does not get in contact with the back elastic component 322, and when the keycap 31 is under the external force and is depressed to a light pressing level position, the keycap 31 gets in contact with the other end of the back elastic component 322. Preferably, the keycap 31 gets in contact with the other end of the back elastic component 322 with a protruding part 315 of the keycap 31. By means of this setting, before the keycap 31 is depressed by a user to a light pressing level position, the keycap 31 only gets in contact with the front elastic component 321 and does not get in contact with the back elastic component 322, so that the user may feel only a counterforce fed back by the front elastic component 321 to resist being depressed. When the keycap 31 is depressed by the user to a light pressing level position, the keycap 31 right abuts against the other end of the back elastic component 322. If the user further applies a force downward at the moment, the user may feel a counterforce generated when the front elastic component 321 and the back elastic component 322 resist being depressed together. That is, because the counterforce becomes larger, the user may feel the force and recognize that depressing has reached a specified stage (the light pressing level position is reached and the first function is already performed). Further, if the user intends to move downwards the keycap 31 from the light pressing level position to the heavy pressing level position, a larger force needs to be applied.

To sum up, in the multi-stage input device in the present invention, the multi-stage cushion component is disposed below the keycap. When pressing the keycap, the user may feel the counterforce fed back by the multi-stage cushion component, and further quickly recognize a position, in multiple level positions, that the keycap is currently located.

Further, by means of cooperation between the multi-stage cushion component and the multi-stage switch, multiple functions can still be performed even if the user only presses a single keycap, thereby greatly improving operation performance.

The foregoing embodiments are merely exemplary descriptions of the principle and effects of the present invention, and are intended to explain technical features of the present invention, but are not intended to limit the protection scope of the present invention. Any variation or equivalent arrangement easily accomplished by a person skilled in the art without departing from the technical principle and spirit of the present invention shall fall within the scope of the present invention. Therefore, the claims of the present invention should be subject to the following claims.

What is claimed is:

1. A multi-stage input device, comprising:
a keycap, comprising a triggering structure, wherein when the keycap is not under an external force, the keycap is located at an initial position, and when the keycap is under the external force, the keycap is depressed to a light pressing level position or a heavy pressing level position according to strength of the external force;
a circuit board assembly, located below the keycap, wherein the circuit board assembly comprises a circuit board and a multi-stage switch that is signal-connected to the circuit board; and the multi-stage switch can be triggered by the triggering structure to generate a light-pressing control signal or a heavy-pressing control signal; and
a multi-stage cushion component, located between the keycap and the circuit board assembly to support the keycap, wherein the keycap is depressed to the multi-stage cushion component according to the strength of the external force; when the strength of the external force is within a first strength interval, the multi-stage cushion component deforms and the keycap is located at the light pressing level position; and when the strength of the external force is within a second strength interval, the multi-stage cushion component deforms and the keycap is located at the heavy pressing level position,
wherein when the keycap is located at the initial position, the keycap does not trigger the multi-stage switch and the multi-stage switch does not generate any signal; when the keycap is located at the light pressing level position, the keycap triggers the multi-stage switch, so that the multi-stage switch generates the light-pressing control signal to perform a first function; and when the keycap is located at the heavy pressing level position, the keycap triggers the multi-stage switch, so that the multi-stage switch generates the heavy-pressing control signal to perform a second function,
wherein the multi-stage input device further comprising an upper cover, wherein the upper cover is disposed between the keycap and the circuit board assembly; and the upper cover comprises a through hole, so that when the keycap is depressed, the triggering structure is inserted into the through hole to trigger the multi-stage switch and wherein the multi-stage cushion component comprises a first elastic component and a second elastic component; the first elastic component is inserted into the through hole, and two ends of the first elastic component respectively abut against the circuit board and the keycap; one end of the second elastic component abuts against the circuit board, and the other end of the second elastic component is suspended; before the keycap is under the external force and is depressed to a light pressing level position, the keycap does not get in contact with the second elastic component; and when the keycap is under the external force and is depressed to a light pressing level position, the keycap gets in contact with the other end of the second elastic component.

2. A multi-stage input device, comprising:
a keycap, comprising a triggering structure, wherein when the keycap is not under an external force, the keycap is located at an initial position, and when the keycap is under the external force, the keycap is depressed to a light pressing level position or a heavy pressing level position according to strength of the external force;
a circuit board assembly, located below the keycap, wherein the circuit board assembly comprises a circuit board and a multi-stage switch that is signal-connected to the circuit board; and the multi-stage switch can be triggered by the triggering structure to generate a light-pressing control signal or a heavy-pressing control signal; and
a multi-stage cushion component, located between the keycap and the circuit board assembly to support the keycap, wherein the keycap is depressed to the multi-stage cushion component according to the strength of the external force; when the strength of the external force is within a first strength interval, the multi-stage cushion component deforms and the keycap is located at the light pressing level position; and when the strength of the external force is within a second strength interval, the multi-stage cushion component deforms and the keycap is located at the heavy pressing level position,
wherein when the keycap is located at the initial position, the keycap does not trigger the multi-stage switch and the multi-stage switch does not generate any signal; when the keycap is located at the light pressing level position, the keycap triggers the multi-stage switch, so that the multi-stage switch generates the light-pressing control signal to perform a first function; and when the keycap is located at the heavy pressing level position, the keycap triggers the multi-stage switch, so that the multi-stage switch generates the heavy-pressing control signal to perform a second function,
wherein the multi-stage input device further comprises an upper cover, wherein the upper cover is disposed between the keycap and the circuit board assembly; and the upper cover comprises a through hole, and a first groove and a second groove that are disposed side by side in a front-rear direction; and when the keycap is depressed, the triggering structure is inserted into the through hole to trigger the multi-stage switch and wherein the multi-stage cushion component comprises a front elastic component and a back elastic component; the front elastic component is disposed in the first groove, and two ends of the front elastic component respectively abut against the keycap and the upper cover; the back elastic component is disposed in the second groove, and one end of the back elastic component abuts against the upper cover, and the other end of the back elastic component is suspended; before the keycap is under the external force and is depressed to a light pressing level position, the keycap does not get in contact with the back elastic component; and when the keycap is under the external force and is depressed to a light pressing level position, the keycap gets in contact with the other end of the back elastic component.

3. The multi-stage input device according to claim 2, wherein the front elastic component has a first length, the back elastic component has a second length, and the first length is greater than the second length.

4. The multi-stage input device according to claim 1, wherein a distance between the initial position and a first level position is 1 millimeter, and a distance between the first level position and a second level position is 1 millimeter.

5. The multi-stage input device according to claim 1, wherein the multi-stage switch is selected from a non-contact capacitive multi-stage switch, a contact capacitive multi-stage switch, a resistive multi-stage switch, an optical sensing multi-stage switch, or a mechanical multi-stage switch.

6. The multi-stage input device according to claim 1, wherein the multi-stage switch is located right below the triggering structure; and when the keycap is under the external force and is depressed, the triggering structure presses the multi-stage switch to trigger the multi-stage switch.

\* \* \* \* \*